(12) United States Patent
Wu et al.

(10) Patent No.: US 6,813,411 B2
(45) Date of Patent: Nov. 2, 2004

(54) OPTICAL SWITCH

(75) Inventors: Kun-Tsan Wu, Tu-Chen (TW); Chih-Yuan Liao, Tu-Chen (TW)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 102 days.

(21) Appl. No.: 10/086,617

(22) Filed: Feb. 28, 2002

(65) Prior Publication Data

US 2003/0081886 A1 May 1, 2003

(30) Foreign Application Priority Data

Oct. 31, 2001 (TW) .......................................... 90218619 U

(51) Int. Cl.$^7$ ................................................. G02B 6/26
(52) U.S. Cl. .............................. 385/18; 385/25; 385/33; 385/16
(58) Field of Search ............................... 385/18, 25, 33, 385/16, 15

(56) References Cited

U.S. PATENT DOCUMENTS

| | | | | |
|---|---|---|---|---|
| 5,436,986 A | * | 7/1995 | Tsai | 385/16 |
| 5,642,446 A | * | 6/1997 | Tsai | 385/16 |
| 6,404,943 B1 | * | 6/2002 | Wang | 385/22 |
| 6,587,614 B2 | * | 7/2003 | Liao et al. | 385/18 |
| 2002/0146199 A1 | * | 10/2002 | Zhang | 385/18 |
| 2003/0081884 A1 | * | 5/2003 | Liao et al. | 385/18 |
| 2003/0113057 A1 | * | 6/2003 | Chen et al. | 385/18 |

* cited by examiner

*Primary Examiner*—Brian Healy
*Assistant Examiner*—Sung Pak
(74) *Attorney, Agent, or Firm*—Wei Te Chung

(57) ABSTRACT

An optical switch (99) according to the present invention comprises a base (60), a switching element (40), a first input port (10), a first output port (15), a second input port (20), a second output port (25), a third input port (30), and a third output port (35). Six holders (61, 62, 63, 64, 65, 66) are arranged symmetrically on the base to hold the three input ports, in alignment with the corresponding three output ports. The switching element is accommodated in a space (67) surrounded by the input and output ports. A driver (not shown) drives the switching element to move in or out of the space or to rotate in the space, thereby switching light beams transmitted from the three input ports between the three different output ports.

13 Claims, 6 Drawing Sheets

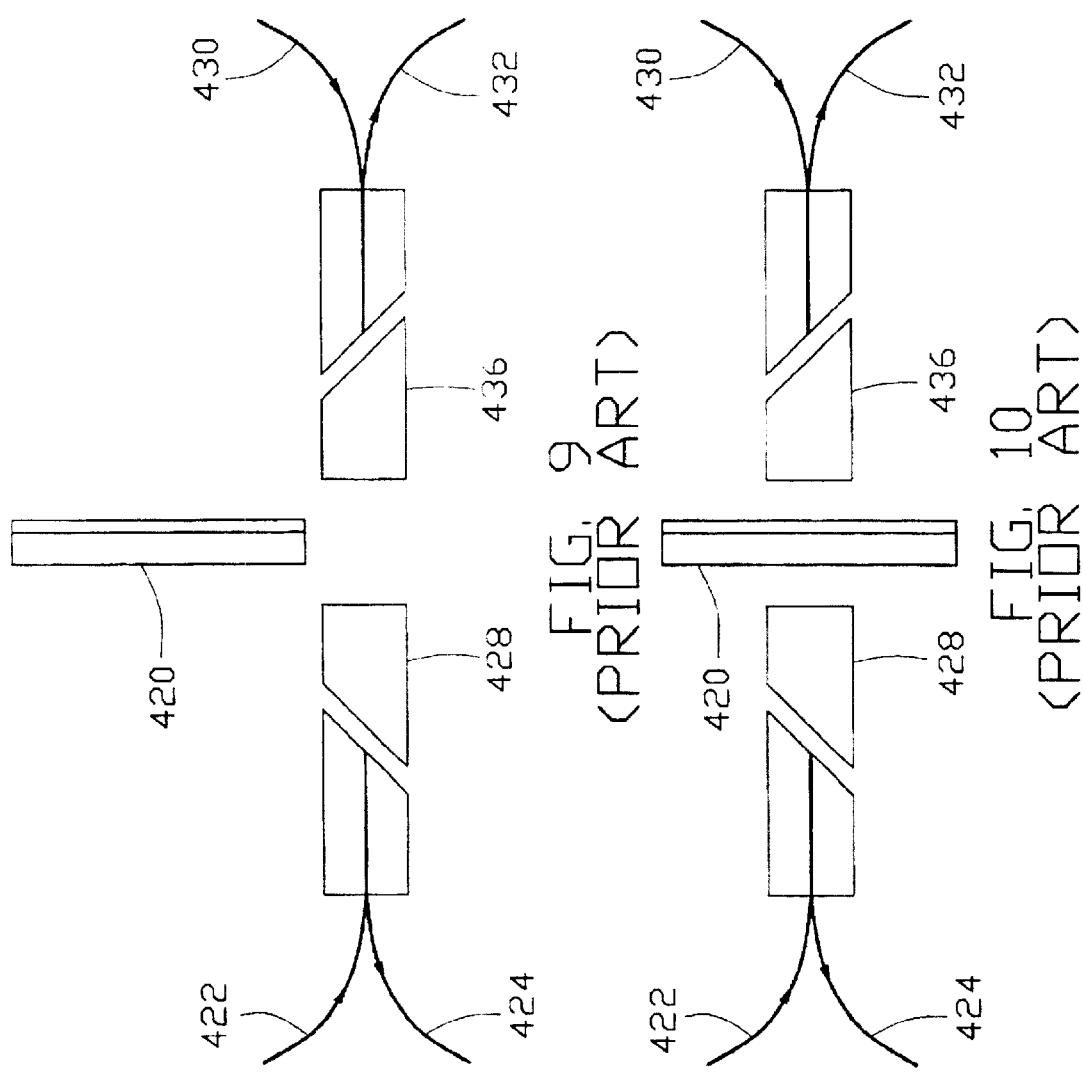

OPTICAL SWITCH

BACKGROUND OF THE INVENTION

1. Field of the Invention

The present invention relates to an optical switch for use in fiber communication and optical network technology, and particularly to a mechanically operated optical switch with a plurality of reflectors as a switching element.

2. Description of Related Art

Optical signals are commonly transmitted in optical fibers, which provide efficient light channels through which optical signals can pass. Recently, optical fibers have been used in various fields, including telecommunications, where light passing through an optical fiber is used to convey either digital or analog information. Efficient switching of optical signals between individual fibers is necessary in most optical processing systems or networks to achieve the desired routing of the signals.

In optical fiber systems, various methods have been previously developed for switching optical signals between fiber cables. Among these previously developed methods, one important category is mechanical optical switches.

Mechanically operated optical switches come in two different designs: in one design, the optical components move, and in the other design, the fibers move. Factors for assessing the capability of an optical switch include low insertion loss (<1 dB), good isolation performance (>50 dB) and bandwidth capacity compatible with the fiber network the switch is supporting.

Moving fiber switches involves the actual physical movement of one or more of the fibers to specific positions to accomplish the transmission of a light beam from one fiber end to another under selected switching conditions. Moving optical component switches, on the other hand, includes optical collimating lenses which expand the light beam coming from the fibers, and then, by using moving prisms or mirrors, redirecting the expanded light beam to other fibers as required by the switching process.

Moving fiber switches involve the actual physical movement of one or more of the fibers to specific positions to accomplish the transmission of a light beam from one fiber end to another under selected switching conditions. Moving optical component switches, on the other hand, include optical collimating lenses which expand the light beam coming from the fibers, and then by using moving prisms or mirrors, redirect the expanded light beam to other fibers as required by the switching process.

The moving fiber switches have a stringent tolerance requirement for the amount and direction of fiber movement. The tolerance is typically a small fraction of the fiber core diameter for two fibers to precisely collimate to reduce loss. The fibers themselves are quite thin and may be subject to breakage if not properly protected. On the other hand, reinforcing the fibers with stiff protective sheaths makes the fibers less flexible, increasing the force required to manipulate each fiber into alignment. Thus these moving fiber switches share a common problem of requiring high precision parts to obtain precise position control and low insertion loss. This results in high cost and complicated manufacture of the switches. Moreover, frequently moving fibers to and fro is apt to damage or even break the fibers.

The moving optical component switches, in contrast, have less stringent movement control tolerance requirements. The presence of the collimating lenses allows relaxation of the tolerance requirements.

As illustrated in FIG. 9 and FIG. 10, U.S. Pat. No. 5,742,712 describes a mechanical optical switch, which relies on a mirror 420 being moveable into an optical path between a first and second fixed collimating lenses (428, 436). When the moveable mirror 420 is displaced out of the optical path (FIG. 9), the light signals from a first input fiber 422 are transmitted to a second output fiber 432 and the light signals from a second input fiber 430 are transmitted to a first output fiber 424 through the first and second collimating lenses (428,436). However, when the moveable mirror 420 is moved into the optical path (FIG. 10), the light signals from the first input fiber 422 are reflected back through the first collimating lens 428 into the first output fiber 424, which is parallel to and in close proximity with the first input fiber 422. The light signals from the second input fiber 430 are likewise reflected back through the second collimating lens 436 into the second output fiber 432, which is parallel to and in close proximity with the second input fiber 430.

In this mechanical optical switch, the gap between the two collimating lenses (428, 436), must be sufficiently large to allow movement of the movable mirror 420 between the two collimating lenses. However, this gap has a significant effect on insertion losses across the switch. For this reason, the gap is preferably less than about 2.0 mm. In addition, in a fixed collimator system initially without a mirror, the insertion of a two-surface mirror will introduce an insertion loss in an input/output port proportional to a thickness of the two-surface mirror.

For the above reasons, an improved optical switch is desired. In particularly, an optical switch is desired which has high optical efficiency and which does not require precise alignment or movement of the optical fibers themselves.

SUMMARY OF THE INVENTION

An object of the present invention is to provide an optical switch in which optical fibers don't move.

Another object of the present invention is to provide an optical switch which allows easy alignment of associated fibers and which has a low insertion loss.

Yet another object of the present invention is to provide an optical switch which uses a plurality of reflectors as a switching element.

An optical switch according to the present invention comprises a base, a switching element, a first input port, a first output port, a second input port, a second output port, a third input port, a third output port. Six symmetrical holders on the base hold the first input port, the second input port and the third input port in alignment with the first output port, the second output port and the third output port, respectively, allowing the light beams from one input port to be output by one of three different output ports. The switching element is accommodated in a space surrounded by the input and output ports. A driver connects to the switching element and drives the switching element to move in and out of the space and to rotate in the space to redirect the light beams transmitting from the input fibers to different the output fibers.

Other objects, advantages and novel features of the invention will become more apparent from the following detailed description when taken in conjunction with the accompanying drawings.

BRIEF DESCRIPTION OF THE DRAWINGS

FIG. 9 is an optical elements cross-sectional view of a prior art mechanical optical switch in a first position;

FIG. 10 is an optical elements cross-sectional view of the prior art switch of FIG. 9 in a second position.

DETAILED DESCRIPTION OF THE INVENTION

Figure 1:
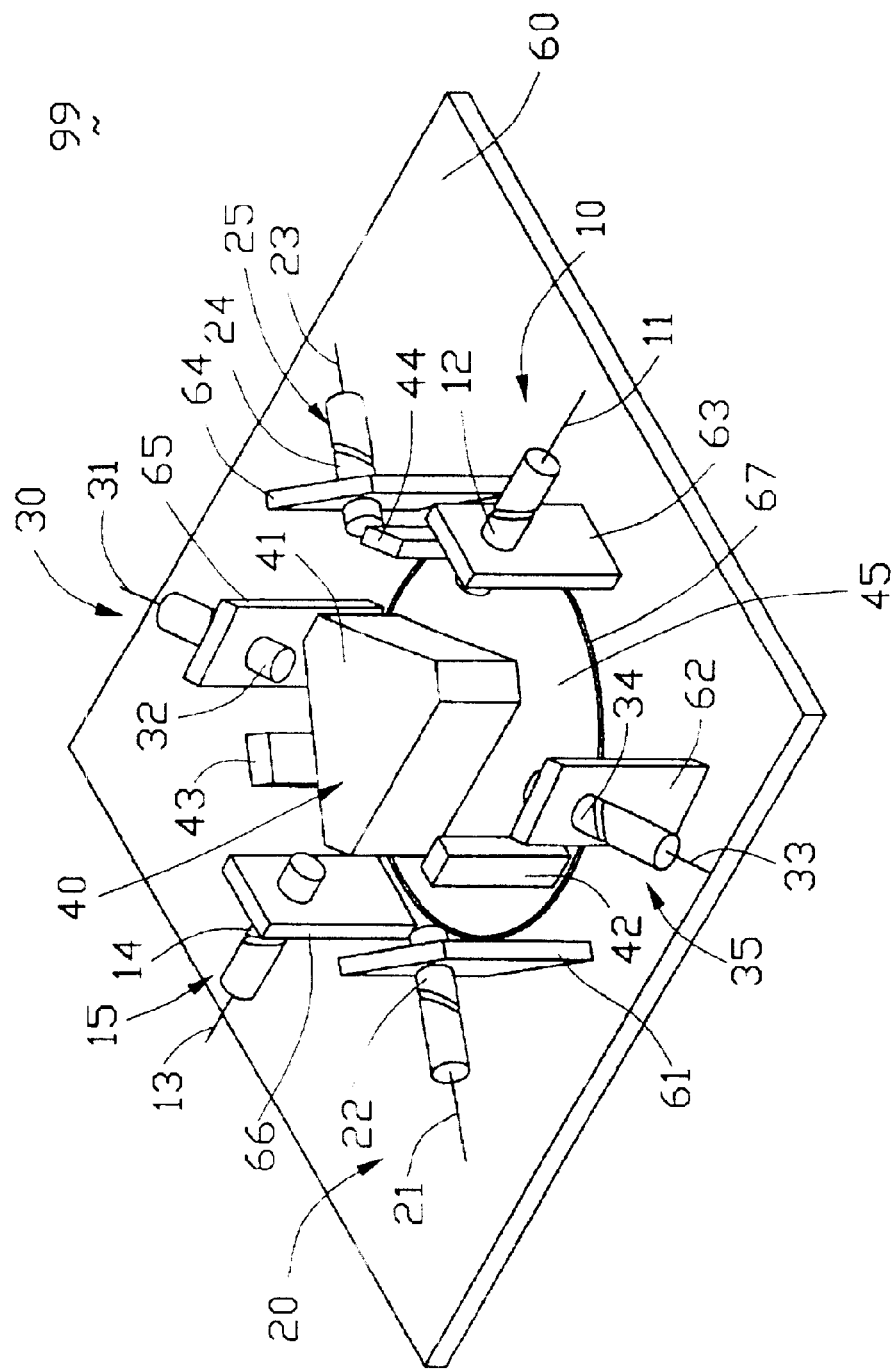
FIG. 1 is a perspective view of an optical switch according to the present invention.

Turning first to FIG. 1, an optical switch 99 according to the present invention comprises a base 60, a switching element 40, a first input port 10, a first output port 15, a second input port 20, a second output port 25, a third input port 30, and a third output port 35. The base 60 has a space 67 in a center (not labeled) thereof, and six symmetrical holders 61, 62, 63, 64, 65, 66 surrounding a circumference of the space 67 and extending upwardly from the base 60. The holders 61, 62, 63, 64, 65, 66 are angularly equally spaced, and each holds an input port or an output port. Specifically, they are spaced 60 degrees apart. The space 67 accommodates the switching element 40.

Figure 2:
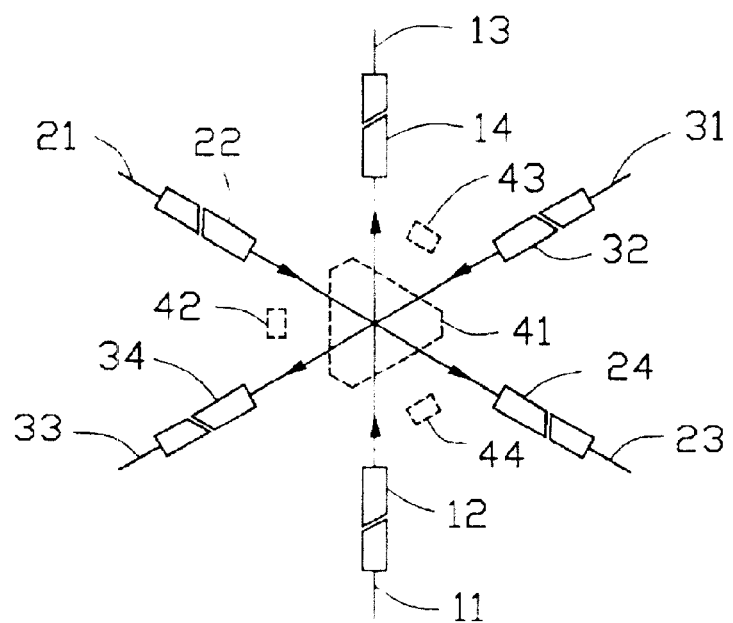
FIG. 2 is an optical elements cross-sectional view of the optical switch of FIG. 1 in a first position.
Figure 3:
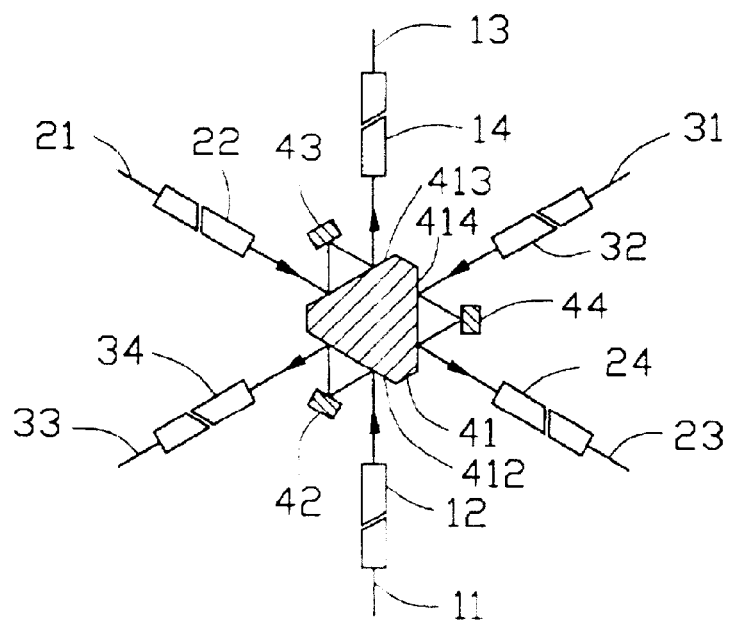
FIG. 3 is an optical elements cross-sectional view of the optical switch of FIG. 1 in a second position.

The switching element 40 comprises a supporter 45, a three-surface mirror 41 mounted on a center of the supporter 45, and a first reflector 42, a second reflector 43 and a third reflector 44 mounted on a circumference of the supporter 45. Referring to FIGS. 2–3, the three-surface mirror 41 is an equilateral triangle column, which defines a first reflecting surface 412, a second reflecting surface 413 and a third reflecting surface 414. The three reflecting surfaces 412, 413, 414 are positioned opposite to three reflecting surfaces of the three reflectors 42, 43, 44, respectively, to cause light beam to reflect between the two opposing reflecting surfaces of the three-surface mirror 41 and the three reflectors 42, 43, 44.

The first input port 10 comprises a first input collimator 12. A first input fiber 11 is inserted into the first input collimator 12. The first output port 15 comprises a first output collimator 14. A first output fiber 13 is inserted into the first output collimator 14. The first input collimator 12 is opposite to and aligned with the first output collimator 14 to direct light beams from the first input fiber 11 to the first output fiber 13.

Each of the second input and output ports 20, 25 and the third input and output ports 30, 35 has a collimator 22, 24, 32, 34 which accepts insertion of a fiber 21, 23, 31, 33 in the exact same way as the first input and output ports 10, 15. The second input collimator 22 is opposite to and aligned with the second output collimator 24 to direct light beams from the second input fiber 22 to the second output fiber 23. The third input collimator 32 is opposite to and aligned with third output collimator 34 to direct light beams from a third input fiber 31 to a third output fiber 33.

In assembly, the sin collimators 12, 14, 22, 24, 32, 34 are assembled in respective holders 63, 66, 61, 64, 65, 62 and accept insertion of respective fibers 11, 13, 21, 23, 31, 33. The six symmetrical holders 61, 62, 63, 64, 65, 66 of the base 60 hold the first input collimator 12, the first output collimator 14, the second input collimator 22, the second output collimator 24, the third input collimator 32 and the third output collimator 34 in alignment to allow light beams from each input fiber 11, 21, 31 to be output by the corresponding output fiber 13, 23, 33 when no element blocks the space 67. The switching element 40 can be accommodated in the apace 67 surrounded by the input and output ports 10, 15, 20, 25, 30, 35. A driver (not shown) connects with the switching element 40 and drives the switching element to move in or out of the space 67, or to rotate in the space 67.

In response to electrical signals, the driver drives the switching element 40 to move between a first position, where the switching element 40 is positioned out of the space 67, a second position, where the switching element 40 is positioned in the space 67, and a third position, where the switching element 40 is positioned in the space 67 but is rotated anticlockwise 60 degrees relative to the second position.

Figure 4:
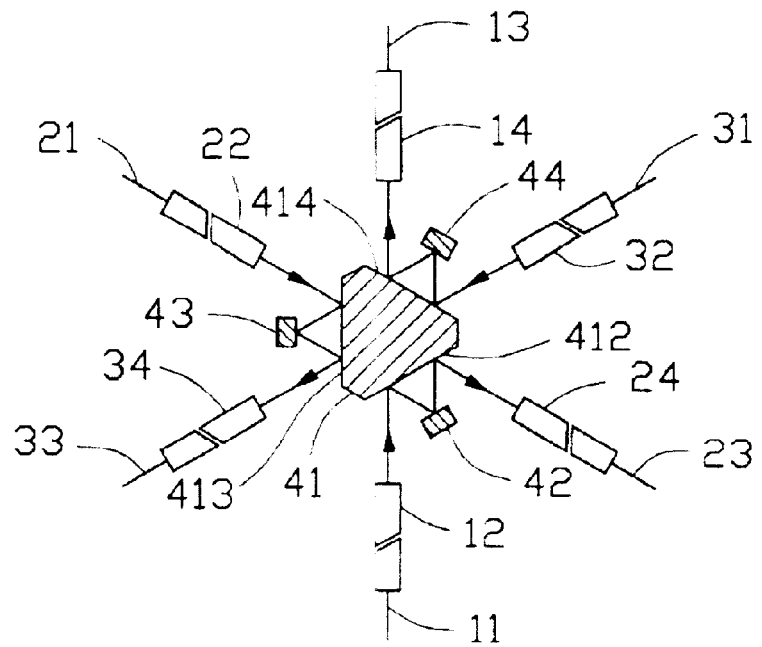
FIG. 4 is an optical elements cross-sectional view of the optical switch of FIG. 1 in a third position.

FIGS. 2–4 illustrate the operation of the optical switch 99. In the first position (FIG. 2), the switching element 40 is out of the space 67. Light beams from the first, second and third input fibers 11, 21, 31 are directed to the first, second and third output fibers 13, 23, 33 through the first input and output collimators 12, 14, the second input and output collimators 22, 24 and the third input and output collimators 32, 34, respectively.

In the second position (FIG. 3), the switching element 40 is in the space 67, and the first reflecting surface 412 is in the optical path of the first input collimator 12 and the third output collimator 34, the second reflecting surface 413 is in the optical path of the second input collimator 22 and the first output collimator 14, and the third reflecting surface 414 is in the optical path of the third input collimator 32 and the second output collimator 24. Light beams from the first input fiber 11 transmit to the first reflecting surface 412 of the three-surface mirror 41 through the first input collimator 12, and then reflect between the first reflecting surface 412 and the first reflector 42 to the third output collimator 34 and are output by the third output fiber 33. Similarly, light beams from the second input fiber 21 are reflected by the second reflecting surface 413 and the second reflector 43 and are output by the first output fiber 13, and light beams from the third input fiber 31 are reflected by the third reflecting surface 414 and the third reflector 44 and are output by the second output fiber 23.

In the third position (FIG. 4), the switching element 40 is rotated anticlockwise 60 degrees relative to the second position, so that the first reflecting surface 412 of the three-surface mirror 41 is in the optical path of the first input collimator 12 and the second output collimator 24, the second reflecting surface 413 is in the optical path of the second input collimator 22 and the third output collimator 34, and the third reflecting surface 414 is in the optical path of the third input collimator 32 and the first output collimator 14. Light beams from the first input fiber 11 are directed to the first reflecting surface 412 by the first input collimator 12, and then reflect between the first reflecting surface 412 and the first reflector 42 to the second output fiber 23 through the second output collimator 24. In like manner, light beams from the second input fiber 21 reflect between the second reflecting surface 413 and the second reflector 43 to the third output fiber 33 through the second input collimator 22 and the third output collimator 34, and light beams from the third input fiber 31 are reflected between the third reflecting surface 414 and the third reflector 44 to the first output fiber 13 through the third input collimator 32 and the first output collimator 14.

FIGS. 5–8 show drawings describing operation of a second embodiment of an optical switch in accordance with the present inventions, which is designed by the reference 99' for distinction. The optical switch 99' makes use of four reflectors to switch three input light beams among alternate optical paths. The four reflectors are a first reflector 42', a second reflector 43', a fourth reflector 47 and a fifth reflector 48. The four reflectors 42', 43', 47, 48 are mounted parallel to one another on the supporter 45'. The switching element 40' connects with a driver (not shown), which drives the switching element 40' to rotate among three positions.

Figure 6:
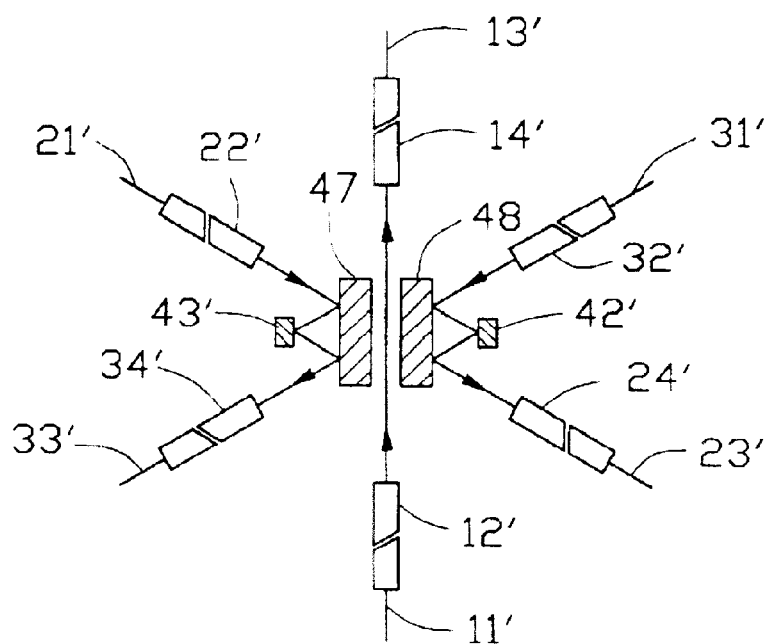
FIG. 6 is an optical elements cross-sectional view of the second embodiment optical switch of FIG. 5 in a first position.
Figure 5:
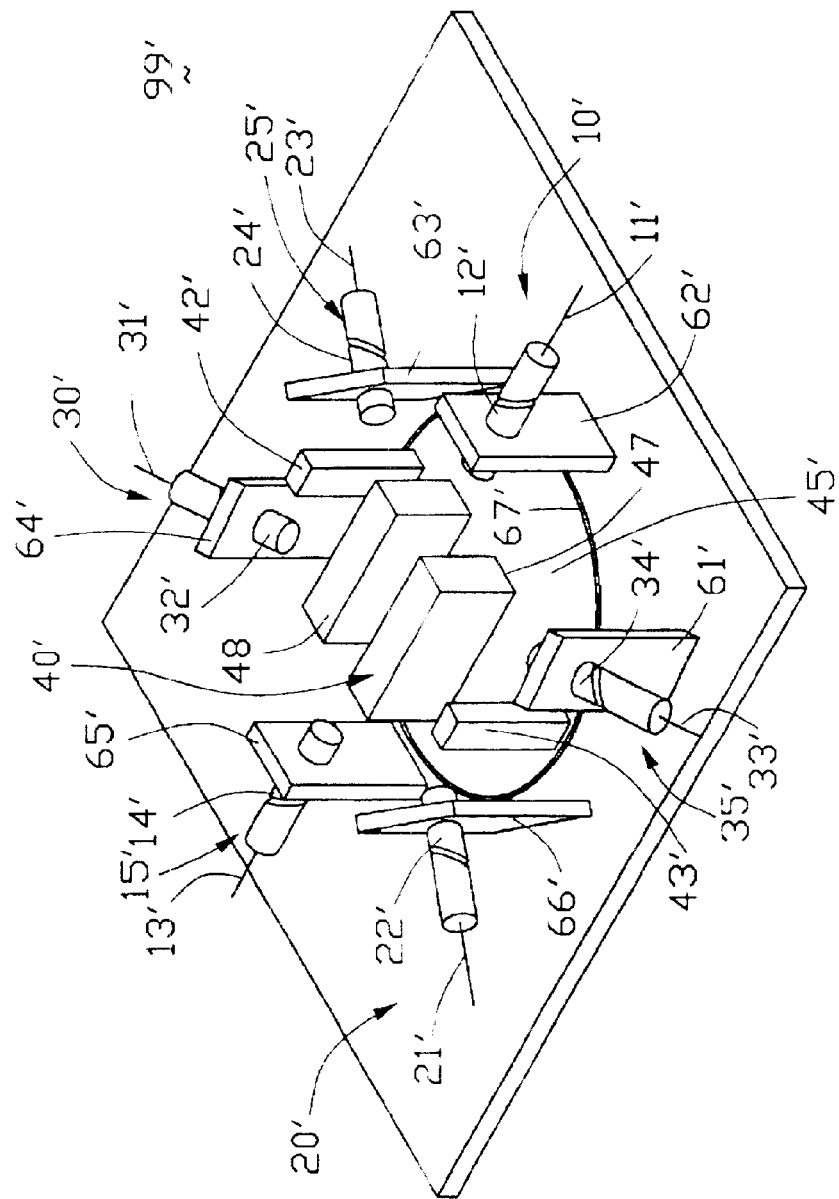
FIG. 5 is a perspective view of a second embodiment of an optical switch according to the present invention.

Turning first to FIG. 6, the switching element 40' is in a first position. The fourth reflector 47 is in the optical path of the second input collimator 22' and the third output collimator 34', and the fifth reflector 48 in the optical path of the third input collimator 32' and the second output collimator 24'. Light beams from the first input fiber 11' are directed to the first output fiber 13' sequentially through the first input collimator 12' and the first output collimator 14'. Light beams from the second input fiber 21' are directed to the fourth reflector 47 through the second input collimator 22', and are then reflected between the fourth reflector 47 and the second reflector 43' to the third output fiber 33' through the third output collimator 34'. In like manner, light beams from the third input fiber 31' pass through the third input collimator 32', are reflected between the fifth reflector 48 and the first reflector 42', and pass through the second output collimator 24' to be output by the second output fiber 23'.

Turning first to FIG. 6, the switching element 40' is in a first position. The fourth reflector 47 is in the optical path of the second input collimator 22' and the third output collimator 34', and the fifth reflector 48 is in the optical path of the third input collimator 32' and the second output collimator 24'. Light beams from the first input fiber 11' are directed to the first output fiber 13' sequentially through the first input collimator 12' and the first output collimator 14'. Light beams from the second input fiber 21' are directed to the fourth reflector 47 through the second input collimator 22', and are then reflected between the fourth reflector 47 and the second reflector 43' to the third output fiber 33' through the third output collimator 34'. In like manner, light beams from the third input fiber 31' pass through the third input collimator 32' are reflected between the fifth reflector 48 and the first reflector 42', and pass through the second output collimator 24' to be output by the second output fiber 23'.

Figure 7:
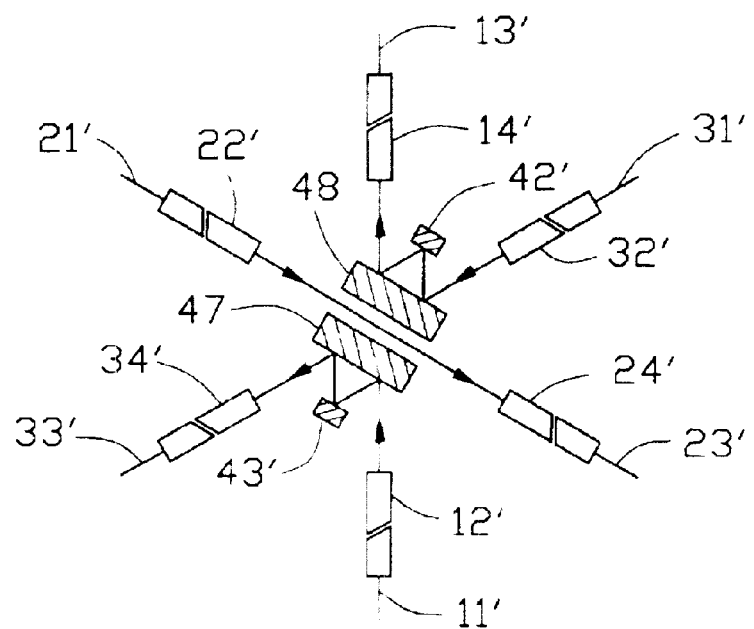
FIG. 7 is an optical elements cross-sectional view of the second embodiment optical switch of FIG. 5 in a second position.

As shown in FIG. 7, a second position of the switching element 40' is rotated anticlockwise 60 degrees from the first position. The fourth reflector 47 is in the optical path of the first input collimator 12' and the third output collimator 34', and the fifth reflector is in the optical path of the third input collimator 32' and the first output collimator 14'. Light beams from the second input fiber 21' are directed to the second output fiber 23' through the second input and output collimators 22', 24'. Light beams from the first input fiber 11' are directed to the fourth reflector 47 through the first collimator 12', and then reflected between the fourth reflector 47 and the second reflector 43' to the third output fiber 33' through the third output collimator 34'. Similarly, light beams from the third input fiber 31' pass through the third input collimator 32' and are reflected between the fifth reflector 48 and the first reflector 42' to the first output fiber 13'.

Figure 8:
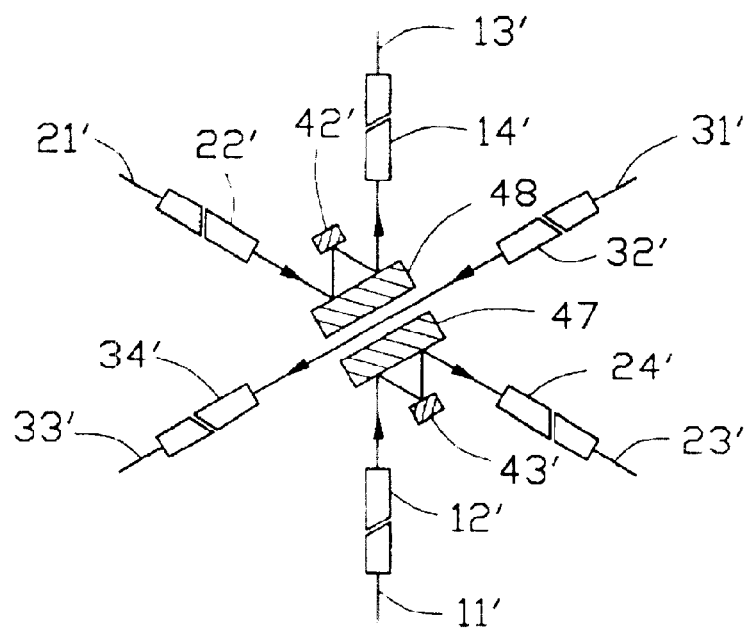
FIG. 8 is an optical elements cross-sectional view of the second embodiment optical switch of FIG. 5 in a third position.

As shown in FIG. 8, a third position of the switching element 40' is rotated anticlockwise 120 degrees from the first position. The fourth reflector 47 is in the optical path of the first input collimator 12' and the second output collimator 24', and the fifth reflector 48 is in the optical path of the second input collimator 22' and the first output collimator 14'. Light beams from the third input fiber 31' are directed to the third output fiber 33' through the third input and third output collimators 32', 34'. Light beams from the first input fiber 11' are directed to the fourth reflector 47 through the first collimator 12', and are reflected between the fourth reflector 47 and the second reflector 43' to the second output fiber 23' through the second output collimator 24'. Similarly, light beams from the second input fiber 21' pass through the second input collimator 22' are reflected between the fifth reflector 48 and the first reflector 42' to the first output fiber 13' via the first output collimator 14'.

Advantages of the optical switch 99 of the present invention over those of the prior art include the following. First, only optical components of the optical switch move; no fibers move. Second, the input and output ports are easily aligned with one another. Third, the optical switch is of a relatively simple design and can be cheaply constructed.

It is to be understood, however, that even though numerous characteristics and advantages of the present invention have been set forth in the foregoing description, together with details f the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example the optical switch may use the switching element 40 and the switching element 40' in the same switch to realize different optical path switching possibilities.

We claim:

1. An optical switch for switching light signals coming from three input fibers among three output fibers, comprising:
   a collimator aligning with each of the input and output fibers for collimating input or output light; and
   a moveable switching element comprising:
   a three-surface mirror having three reflecting surfaces; and
   three reflectors, one mounted opposite each reflecting surface of the three-surface mirror; whereby, the switching element is moveable between three different positions, and when light signals are transmitting from the input fibers, they transmit directly to a corresponding output fiber, or are reflected between one reflecting surface and one reflector to be output by one of the other two output fibers.

2. The optical switch as claimed in claim 1, wherein the switching element is able to move into or out of or to rotate within a space surrounded by the collimators.

3. The optical switch as claimed in claim 2, wherein each one input fiber is opposite to one corresponding output fiber, whereby light beams from each one input fiber can be output by the corresponding opposite output fiber when the switching element is in one of its three positions.

4. The optical switch as claimed in claim 1, further comprising a driver, which drives the switching element to move between its three positions.

5. An optical switch for switching light signals, comprising:
   a plurality of input optical fibers;
   a plurality of output optical fibers;
   a collimator aligning with each of the input and output fibers for collimating input or output light; and
   a moveable switching element comprising four reflectors, wherein the four reflectors are parallel to each other, light signals from the plurality of input fibers are transmitted to the corresponding output fibers respectively, the switching element is moveable between three different positions, and the light signals of each of the input fibers are transmitted to different of the plurality of output fibers when the switching element is at different of the three positions, and whereby when the light signals are transmitted from the input fibers, they transmit directly to a corresponding output fiber, or are reflected between two of the four reflectors to be output by one of the other two output fibers.

6. The optical switch as claimed in claim 5, wherein the four reflectors are able to move into or out of or to rotate within a space surrounded by the collimators.

7. The optical switch as claimed in claim 6, wherein one input fiber is aligned with one opposite output fiber, and light beams from one input fiber can be output by a corresponding opposite output fiber in each of the three different positions of the switching element.

8. The optical switch as claimed in claim 5, further comprising a driver, which drives the switching element to move between the three positions.

9. An optical switch for switching light signals, comprising:
   at least two input optical fibers;
   at least two output optical fibers;
   at least two main reflecting surfaces, each main reflecting surface being in an optical path between one of the input fibers and one of the output fibers; and
   at least two secondary reflecting surfaces, each secondary reflecting surface being substantially parallel to one of the main reflecting surfaces to connect an optical path from one of the input optical fibers to one of the output optical fibers, wherein when the switch is provided, light beams from the input optical fiber reflect once off the main reflecting surface, then reflect once off the secondary reflecting surface, then reflect a second time off the main reflecting surface, and then are output by the output optical fiber, and each of the input optical fibers is coupled to a different one of the output optical fibers when the optical switch changes between at least two positions.

10. A multi-channel optical switch comprising:
    plural pairs of input ports and output ports substantially at equal intervals arranged along a circumference surrounding at least a moveable multi-channel switch therein;
    said multi-channel switch providing a plurality of reflecting surfaces; wherein
    when no switch is provided, light coming from one input port leaves from the corresponding output port which is aligned with said input port diametrically; and when said multi-channel switch is provided, some respective light coming from at least one input port is reflected to the corresponding output port, which is a neighbor of said at least one input port, and some respective light coming from at least another input port is directly transmitted to the corresponding output port.

11. The multi-channel optical switch as claimed in claim 10, wherein there are at least three pairs of input ports and output ports evenly arranged along the circumference.

12. The multi-channel optical switch as claimed in claim 10, wherein the reflected light experiences three reflections via said switch before entering the corresponding neighboring output port.

13. The multi-channel optical switch as claimed in claim 10, wherein the input ports and the output ports are alternately arranged along said circumference.

* * * * *